Sept. 25, 1956
W. STELZER
2,764,262
DUAL HYDRAULIC BRAKE SYSTEM
Filed June 4, 1953
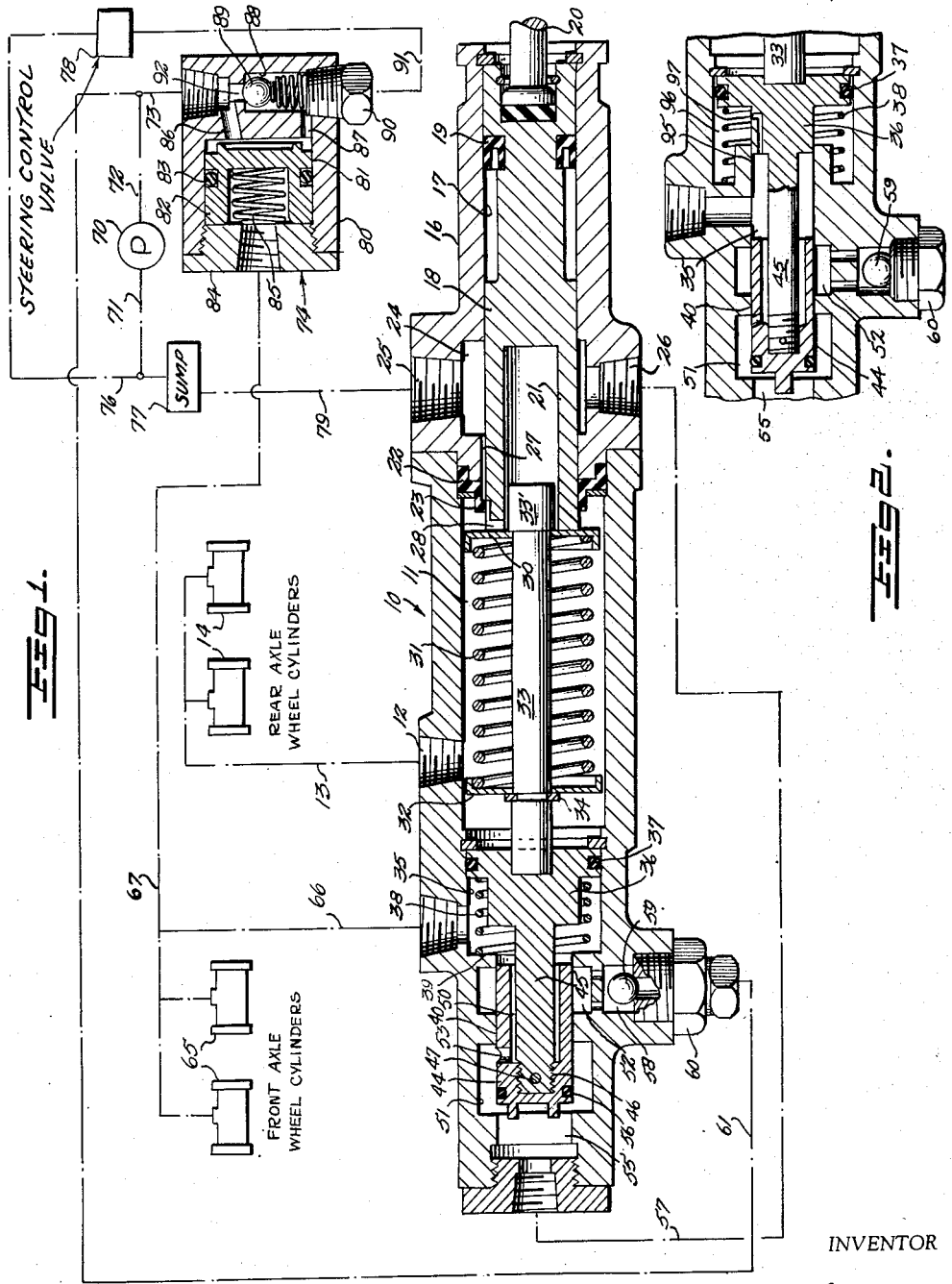
INVENTOR
*William Stelzer*
BY *John F. Phillips*
ATTORNEY

United States Patent Office 2,764,262
Patented Sept. 25, 1956

2,764,262

DUAL HYDRAULIC BRAKE SYSTEM

William Stelzer, Summit, N. J.

Application June 4, 1953, Serial No. 359,494

19 Claims. (Cl. 188—152)

This invention relates to a hydraulic booster brake system, and more particularly to a duel system wherein manually applied hydraulic fluid pressure actuates one set of wheel cylinders, front or rear, and power generated hydraulic fluid pressure operates the other set of wheel brakes.

The present construction is particularly adapted for use on lower priced vehicles equipped with hydraulic steering and present a highly simplified type of brake mechanism which may be very economically produced.

An important object of the invention is to provide a novel dual hydraulic brake system wherein the application of braking pressure to one set of wheel cylinders, for example those of the rear wheels, is generated by manually applied force on the brake pedal while hydraulic pressure for the other wheel cylinders, namely the front wheel cylinders, is derived from a suitable source such as the hydraulic motor employed in connection with the steering booster mechanism.

A further object is to provide such a dual system in which the application of pump-generated hydraulic pressure is fully under the control of the operator at all times in accordance with the operation of the brake pedal.

A further object is to provide such a system wherein there is a direct proportionate pressure relationship between the pump-applied hydraulic pressure and the manually applied hydraulic pressure, thus maintaining an accurate feel in the brake pedal and maintaining the controlling of the power applied hydraulic pressure at all times accurately under the control of the operator.

A further object is to provide two separate hydraulic systems one for the wheel cylinders of the front axle and the other for the wheel cylinders of the rear axle, so that if a wheel cylinder should fail (for example due to cup failure), the system serving the other axle would still be operative.

A further object is to provide a very inexpensive type of "power brake" where the booster ratio does not have to be very great, for example in smaller lighter motor vehicles having servo brakes and where a low pedal is desired, and in many such motor vehicles a booster ratio of 1:2 is sufficient, whereby the operator is required to perform only half the work when applying the brakes.

A further object is to provide such a system which may be used in conjunction with a source of hydraulic fluid pressure supply, for example in a steering booster mechanism, where only a limited maximum pressure is usable, and wherein a pressure greater than that available from the pump or other source may be delivered to the front wheel cylinders by utilization of manual force beyond the point at which such maximum pump pressure is reached.

Other objects and advantages of the invention will become apparent during the course of the following description.

In the drawing I have shown two embodiments of the invention. In this showing Figure 1 is a longitudinal sectional view through the master cylinder and associated elements, a by-pass valve associated with the steering booster mechanism being shown in section and parts being shown diagrammatically, and Figure 2 is a fragmentary sectional view similar to Figure 1 showing a modified type of master cylinder construction.

Referring to Figure 1 the numeral 10 designates a preferably cast housing forming therewithin a master cylinder 11 having an outlet 12 connected by suitable lines 13 to two of the wheel cylinders 14 of the motor vehicle, these wheel cylinders preferably being those associated with the rear axle of the vehicle. At one end of the body 10 is fixed in any suitable manner a second cast housing 16 having a bore 17 therein in which is mounted a plunger 18 sealed in the bore 17 as at 19 and adapted to be actuated by a push rod 20 having mechanical connection in any suitable manner with the brake pedal of the motor vehicle. The pedal of course is conventional and need not be illustrated.

The end of the body 16 adjacent the master cylinder projects thereinto and the extremity of the body 16 is surrounded by a seal 22 having an inner lip 23 in sliding sealing relationship with the plunger 18. To the right of such lip, the body 16 is provided with a chamber 24 having two outlets 25 and 26 for purposes to be described. An internal groove 27 leads from the chamber 24 to the seal lip 23 to supply fluid past this lip into the master cylinder 11 through a groove 28 in the adjacent end of the plunger 18 when the parts are in the off position shown in Figure 1.

A spring seat 30 engages against the inner end of the plunger 18 and is engaged by one end of a relatively heavy return spring 31, the other end of this spring engaging a seat 32 surrounding an axial rod 33 and fixed in position thereon by a snap ring 34.

Beyond the left hand of the master cylinder chamber 11, the body 10 is provided with a slightly smaller cylinder forming a fluid chamber 35 in which is arranged a plunger 36 the right hand end of which fits the bore of the chamber 35 and is sealed by an O ring 37. The body of the plunger 36 is reduced below the diameter of the wall of the chamber 35 to be surrounded by a spring 38, one end of which engages against the enlarged end of the plunger 36 and the other end of which engages against a shoulder 39 formed at the right hand end of a reduced bore 40 formed in the body 10.

A closed ended spool 44 is slidable in the bore 40 as shown in Figure 1 and has an elongated axial recess into which projects an axial stem 45 carried by the plunger 36. This stem 45 is connected to the valve 44 adjacent the closed end thereof by relatively loose threads 46 and by a relatively loose pin 47, the lack of a rigid connection between the stem 45 and valve 44 permitting the latter to find its proper seat in sliding relationship in the bore 40.

The diameter of the stem 45 is less than the internal diameter of the valve 44 to provide an annular space 50 communicating at its right hand end with the interior of the chamber 35. The bore 40 is provided therein with two annular chambers 51 and 52, the former of which communicates through a port 53 in the valve 44 with the space 50 surrounding the stem 45, hence the chamber 51 is always in communication with the chamber 35. The bore 40 continues to the left of the valve 44 to provide a chamber 55 which, in the "off" position of the parts is in communication with the chamber 51 around the adjacent end of the valve 44, the latter normally occupying the position shown in Figure 1. Such end of the valve 44 is provided with an O ring 56 slidable into the chamber 55 to form a seal between this chamber and the chamber 51 when the mechanism is operated in the manner described below.

The right hand end of the valve 44, in the "off" positions of the parts, extends slightly beyond the chamber 52 and closes communication between this chamber and the chamber 35. It will become apparent that slight movement of the valve 44 to the left will open communication between chambers 35 and 52. A chamber 58 is arranged radially outwardly of one side of the chamber 52 and is in communication therewith, and a ball check valve 59 is arranged in the chamber 58 and is engageable under conditions to be described against the inner end of the fitting 60 to which is connected one end of a pipe line 61 to be referred to later.

As described below, the chamber 35 is adapted to supply pressure fluid to the wheel cylinders 65 preferably associated with the front axle, this fluid flowing through a line 66 into a connecting line 67, one end of which is branched for connection with the wheel cylinder 65 and the other of which is utilized for a purpose to be described.

The pipe line 61 is to be supplied with pressure hydraulic fluid from a suitable pumping source, shown in the present instance as being the booster steering mechanism of a motor vehicle. Such mechanism comprises a pump 70 having an inlet line 71 and an outlet line 72, the latter of which is connected by a line 73 to the line 61 and also to a by-pass valve 74 further described below. The inlet line 71 of the pump is connected to a line 76 one end of which leads to a fluid sump 77 and the other end of which is connected to the valve 78 operable by the steering wheel for controlling the booster motor.

The by-pass valve is indicated as a whole by the numeral 74 and comprises a body 80 having a bore 81 therein forming a cylinder in which is arranged a plunger valve 82 sealed by an O ring 83. This valve is adapted to have its left hand end as in Figure 1 seated against a cap 84 on the valve body and the line 67 communicates through this cap with the interior of the cylinder 81. A spring 85 urges the valve 82 toward the right to tend to cut off communication between a pair of ports 86 and 87. Normally the pressure developed by the pump 70 and delivered through lines 72 and 73, through port 86, will move the valve 82 toward the left to provide for a free flow of fluid between the ports 86 and 87. The latter port leads into a chamber 88 normally closed at its top by a ball check valve 89. The chamber 88 has its lower end provided with a fitting 90 connected to one end of a pipe line 91 leading to the inlet side of the steering control valve 78. The ball check valve 89 controls an upper port 92 and it will become apparent that when pressure in the lines of the front wheel brake cylinders 65 moves the valve 82 toward the right to close communication between ports 86 and 87, pump pressure will be by-passed around the check valve 89 in accordance with the tensioning of the seating spring therefor.

A slightly modified form of the invention is shown in Figure 2 to take care of an extreme condition referred to below. In Figure 1 the body of the plunger 36 is longitudinally spaced from the shoulder 39. In Figure 2, the body of the plunger 36 is slidable in a longitudinally extended portion of the bore 40, indicated by the numeral 95. In this case, the pressure chamber 35 is within the bore 40, and the chamber 35 communicates with an auxiliary chamber 96, in which the spring 38 is arranged, by a restricted passage 97 formed through the plunger 36 for a purpose to be described.

Operation

In the operation of the device, the brake pedal (not shown) is depressed to actuate the plunger 18 to move the latter toward the left, thus imparting movement to the spring seat 30 and transmitting force through return spring 31 to the spring seat 32 and thence to the rod 33, which engages at its left hand end with the plunger 36. This plunger will be moved from its "off" position shown, taking with it the spool valve 44, the left hand end of which will move into the chamber 55 and thus cut off communication between this chamber and the chamber 51. Substantially simultaneously, the right hand end of the valve 44 will move to uncover the chamber 52, thus communicating this chamber with the chamber 35. In the movement thus far described, no fluid will have been transmitted to the wheel cylinders. The movement thus far has been merely to operate the power valve 44 and to compress the spring 38. It should be noted at this point that the spring 38 is much weaker than the return spring 31.

Upon movement of the valve 44 as described, pressure fluid will flow from the pump 70 through lines 72 and 61, into chamber 58 around the check valve 59 thence through chambers 52 and 35, and through lines 66 and 67 into the front axle wheel cylinders 65. This pressure fluid will be a by-pass pressure of 50–200 p. s. i. generated by the pump and depending upon the resistance being offered by the steering booster valve, and this pressure fluid is transmitted to the wheel cylinders of the front axle, as stated. The actual pressure transmitted to the front wheel cylinders will be dependent upon the force of the spring 31, since, as soon as the pressure in the chamber 35 is sufficient to overpower the spring 31, the valve 44 again closes communication between chambers 52 and 35. Thus a follow-up valve action is provided in which the delivery of pumped pressure to the front axle cylinders will be dependent upon the force of the spring 31 and the loading of this spring, in turn, will depend upon the extent and force applied to the brake pedal by the operator.

Upon a further depression of the brake pedal to move the plunger 18 toward the left, the groove 28 will move away from the seal lip 23, thus cutting off communication between the chamber 24 and master cylinder 11 through the internal groove 27. Pressure now will be generated in the master cylinder 11 by the manual effort applied in moving the plunger 18, and fluid will move from the master cylinder 11 through line 13 into the wheel cylinders for the rear axle to apply the rear brakes. The hydraulic pressure now being generated in the master cylinder 11 will assist the spring 31 in effecting movement of the plunger 36, and pressure in the chamber 35 still reacts to the right against the force being applied to the plunger 36 and accordingly pressure delivered to the front wheel cylinders will bear a direct proportion to the pressure being applied to move the master cylinder plunger 18. Of course, it will be apparent that a higher pressure will exist in the chamber 35 since the effective area to the left of the plunger 36, acted upon by the pumped hydraulic pressure, will be less than the effective area at the right side of the plunger 36, due to the cross-sectional area of the bore 40, the pressure in the chamber 35 acting toward the left against the valve 44. Nevertheless, there will be a definite proportional relationship between pressures in chambers 11 and 35.

If the hydraulic pressure in chamber 35 reaches the maximum pressure available from the pump, for example 400 p. s. i., then further movement of the plunger 36 by the rod 33 will not increase the pumped pressure in the chamber 35. Additional pressure will be built up in this chamber by the manual force being applied by the operator, the check valve 59 closing to trap hydraulic fluid in the chamber 35 and in the line 66 leading to the front wheel cylinders 65. Therefore, the pressure of the pump 70 will be utilized for the front wheel cylinders, but this pressure will not limit the pressure to which the front wheel cylinders can be subjected since additional pressure may be manually built up through the effort of the operator in depressing the brake pedal. Movement of the plunger 36 will be extremely slight since the front wheel brakes will have been already set and it is largely a matter merely of building up static pressure in the brake lines. The O ring 56, of course, will now be arranged in the bore of the chamber 55 and will seal against leakage of fluid into the latter chamber.

In the releasing of the brakes there will be a retractile movement of the plunger 18 incident to the releasing of the brake pedal. The chamber 35 will expand as the plunger 36 moves to the right following movement of the rod 33 and plunger 18. Pressures in the chambers 35 and 11 will be gradually decreased until the valve 44 closes communication between the chambers 52 and 35 and opens communication between the chambers 51 and 55, the chamber 51 being in fixed communication with the chamber 35 through port 53 and passage 50. As soon as chambers 51 and 55 are communicated with each other, of course fluid is free to flow from the chamber 35 through line 57 into port 26, chamber 24 thence back to the sump 77 through line 79. This flowing of the pressure from chamber 55 to chamber 24 causes a rise in pressure above atmospheric pressure in the chamber 24, so that the usual conventional residual pressure valve may be dispensed with. In the fully released positions of the parts as shown in Figure 1, communication is established between the master cylinder 11 and the chamber 24 through groove 28 in the plunger 18 and the internal groove 27. Excess fluid thus can flow back to the sump 77.

In the event of a failure of power in the pumping system, or a failure of the front wheel cylinders, the plunger 36 would quickly move its entire short stroke to come to rest against the shoulder 39 when the pedal is depressed. The manual effort then exerted by the operator would have to be double that which would be fully adequate considering that no greater effort could be exerted by means of a low pedal. The manually displaced fluid from the master cylinder 11 would flow to the rear wheel brake cylinders 14 to apply the rear brakes.

In case of a failure in the manual system, such as a failure in the rear axle cylinder or a failure of the cup 22, the plunger 18 would be moved upon depression of the brake pedal without producing pressure in the master cylinder 11. The plunger 36 would then be actuated by the spring 31 to operate the valve mechanism to admit pumped hydraulic fluid from chamber 52 to chamber 35 and thence to the wheel cylinders 65. Thus the front brakes could be applied to the full extent of the availability of pumped fluid pressure. At the same time, the spring 31 would be compressed and the head 33' would move relatively into the bore 21 until it contacts with the inner extremity thereof, whereupon direct manual force could be applied through rod 33 to the plunger 36 to increase the pressure in the chamber 35 above the pressure being received from the pump 70. This, of course, would provide the brake pedal with perfect "feel."

With the system illustrated it is possible that a violent depression of the brake pedal would move the plunger 36 very rapidly to its limit of movement before there is time for the pump to set the brakes. Movement of the plunger 36 then would be spent and the only pressure available to the front axle wheel cylinders would be the pumped pressure, it being impossible thereafter to further increase the pressure in the chamber 35 by manual effort. This would not be a serious drawback since there would be available the usually sufficient approximately 400 p. s. i. from the pump 70 for applying the front wheel brakes.

If this dependence under extreme conditions upon a maximum pump pressure for applying the front wheel brakes is not satisfactory, the device shown in Figure 2 may be employed. The small orifice or passage 97 provides a sufficient damping action to retard movement of the plunger 36, upon a violent depression of the brake pedal, to allow time for the pumped pressure flowing into chamber 35 to apply the front wheel brakes.

The by-pass valve 74 may be used or not as desired. The pump 70 will circulate pressure fluid through pipes 72 and 73 and through port 86 into the right hand end of the cylinder 81. Assuming that the brakes are not in operation, pressure against the right hand end of the valve 82 will move this valve against the tension of the spring 85, thus fully connecting ports 86 and 87 for the free flow of fluid into pipe 91, steering control valve 78, and line 76, back to the sump or to the inlet side of the pump. To assure the availability of sufficient braking pressure for the front wheel brakes, the line 67 is tapped into the cap 84 and when the brakes are applied, the front wheel cylinder braking pressures will act on the left hand end of the valve 82, assisting the spring 85 in seating the valve 82 toward the right to close communication between ports 86 and 87. This will assure a somewhat higher braking pressure for the front wheel brakes. At the same time, the pumped fluid may flow past check valve 88 to continue its cycle of movement through the steering control valve 78, the check valve 89 acting to maintain higher pump outlet pressures for the braking action while at the same time permitting a sufficiently free flow of fluid for operating the steering booster mechanism.

The constructions shown are intended to be illustrative, and the scope of the invention is defined in the appended claims.

I claim:

1. In a hydraulic braking system for an automotive vehicle having a pair of sets of wheel cylinders for operating the brakes, a master cylinder comprising cylinder means, a pair of pistons therein one of which is operable by the operator, means to transmit from said cylinder means hydraulic fluid displaced by said one piston to one set of wheel cylinders, a second piston slidable in said cylinder means and having one side subject to hydraulic pressure generated by said first piston, a source of hydraulic pressure, connections between said source and the other set of wheel cylinders, and a valve controlling the connections between said source and said other set of wheel cylinders, said valve normally occupying a closed position and being connected to said second piston to be moved to an open position to connect said source to said other set of wheel cylinders when said second piston is moved in response to hydraulic pressure generated by said first piston.

2. A braking system in accordance with claim 1 wherein said connections between said source and said other set of wheel cylinders include a chamber in said cylinder means at the other side of said second piston, and means for relieving pressure from said chamber when said valve is in a normally off position.

3. A braking system in accordance with claim 1 wherein said connections between said source and said other set of wheel cylinders include a chamber in said cylinder means at the other side of said second piston, an exhaust line connected to said chamber when said valve is in a normal off position, and a valve element carried by said valve and movable to close said exhaust line when said second piston is moved from its normal off position.

4. In a hydraulic braking system for an automotive vehicle having a set of wheel cylinders for the front wheels and a set of wheel cylinders for the rear wheels, a master cylinder comprising a first piston operable by the operator, connections for transmitting hydraulic fluid displaced by said first piston to one set of wheel cylinders, means biasing said first piston to a normal off position, a second piston slidable in said master cylinder and having one side thereof subject to hydraulic pressure generated by said first piston, means biasing said second piston to a normal off position, a source of hydraulic pressure, and means operable by said second piston upon movement thereof from its normal off position by hydraulic pressure generated by said first piston for connecting said source to the other set of wheel cylinders.

5. A hydraulic braking system according to claim 4 wherein said means for connecting said source to said other wheel cylinders comprises fluid connections between said source and said other set of wheel cylinders, and a valve connected to said second piston and controlling said fluid connections.

6. A hydraulic braking system according to claim 4 wherein said means for connecting said source to said other wheel cylinders comprises fluid connections between said source and said other set of wheel cylinders, a valve connected to said second piston and controlling said fluid connections, an exhaust line communicating with said fluid connections when said second piston is in its normal off position, and means responsive to movement of said second piston from its normal off position for closing said exhaust line.

7. A hydraulic braking system according to claim 4 wherein said means for connecting said source to said other wheel cylinders comprises fluid connections between said source and said other set of wheel cylinders, a valve connected to said second piston and controlling said fluid connections, an exhaust line communicating with said fluid connections when said second piston is in its normal off position, and a valve element carried by said valve and movable therewith upon movement of said second piston from its normal off position for closing said exhaust line.

8. A hydraulic braking system in accordance with claim 4 wherein said second piston is provided at the other side thereof with a chamber into which said second piston is movable a sufficient distance to displace fluid into said other set of wheel cylinders, and a lost motion connection between said pistons whereby, in the event of a failure in said source, said first piston will move a predetermined distance from its normal off position and then transmit movement to said second piston to displace fluid from said chamber.

9. In a hydraulic braking system for an automotive vehicle having two pairs of wheel cylinders for the vehicle wheel brakes, a master cylinder comprising cylinder means having a pair of pistons slidable therein, one of said pistons being manually operable to displace fluid from said cylinder means, connections for conveying such displaced fluid to one set of wheel cylinders, the other piston having one side thereof subject to pressure generated by said one piston to be moved from a normal off position, means biasing said other piston to its normal off position, a constantly operable hydraulic pump having an inlet side and an outlet side, a sump connected to the inlet side of said pump, connections from the outlet side of said pump to the other set of wheel cylinders, means operable upon movement of said other piston from its normal off position for opening the connections from said pump to said other set of wheel cylinders, and means for exhausting to said sump hydraulic pressure in the connections between said pump and said other set of wheel cylinders when said other piston is in its normal off position.

10. A hydraulic braking system according to claim 9 wherein the means for opening the connections between said pump and said other set of wheel cylinders comprises a normally closed valve in such connections mechanically connected to said other piston to be moved thereby to an open position upon movement of said other piston from its normal off position.

11. A hydraulic braking system according to claim 9 wherein the means for exhausting hydraulic fluid to said sump comprises a valve element having mechanical connection with said other piston and occupying a normal open position from which it is movable to closed position upon movement of said other piston from its normal off position.

12. A hydraulic braking system according to claim 9 wherein the means for opening the connections between said pump and said other set of wheel cylinders comprises a normally closed valve in such connections mechanically connected to said other piston to be moved thereby to an open position upon movement of said other piston from its normal off position, the means for exhausting hydraulic fluid to said sump comprising a normally open valve element carried by said valve and movable therewith to a closed position upon movement of said other piston from its normal off position.

13. In a hydraulic braking system for an automotive vehicle having two pairs of wheel cylinders for the vehicle wheel brakes, a master cylinder comprising cylinder means having a pair of pistons therein, one of said pistons being manually movable in one direction to displace fluid from said cylinder means, connections for conveying such displaced fluid to one set of wheel cylinders, the other piston being spaced in said direction from said one piston and having its side toward said one piston subject to pressure generated thereby to be moved from a normal off position, means biasing said other piston to said normal off position, a source of hydraulic fluid pressure, connections between said source and the other set of wheel cylinders, valve means connected to and operable upon movement of said other piston from its normal off position for opening the connections from said source to said other set of wheel cylinders, and resilient means connected to said one piston and having mechanical connection with said other piston whereby, upon a failure of said one piston to generate pressure in said cylinder means upon movement of said one piston in said direction, said resilient means will be loaded by said one piston to transmit a force to said other piston to move it away from its normal off position.

14. In a hydraulic braking system for an automotive vehicle having two pairs of wheel cylinders for the vehicle wheel brakes, a master cylinder comprising cylinder means having a pair of pistons therein, one of said pistons being manually movable in one direction to displace fluid from said cylinder means, connections for conveying such displaced fluid to one set of wheel cylinders, the other piston being spaced in said direction from said one piston and having its side toward said one piston subject to pressure generated thereby to be moved from a normal off position, means biasing said other piston to said normal off position, a source of hydraulic fluid pressure, connections between said source and the other set of wheel cylinders, valve means connected to and operable upon movement of said other piston from its normal off position for opening the connection from said source to said other set of wheel cylinders, an axial rod connected to said other piston and projecting toward said first piston and having axial lost motion with respect thereto whereby said one piston is movable a predetermined distance from its off position without transmitting movement through said rod to said other piston, and a compression spring surrounding said rod, said compression spring having mechanical connection at one end with said one piston and at its other end with said other piston, whereby failure of said one piston to generate hydraulic pressure in said cylinder means will compress said spring and generate a force to move said other piston from its normal off position, after which said lost motion will be taken up and said one piston will transmit a direct mechanical force to said other piston to assist in moving the latter in a direction away from its normal off position.

15. In a hydraulic braking system for an automotive vehicle having two pairs of wheel cylinders for the vehicle wheel brakes, a master cylinder comprising cylinder means having a pair of pistons therein, one of said pistons being manually movable in one direction to displace fluid from said cylinder means, fluid pressure transmitting conduit means for conveying such displaced fluid to one set of wheel cylinders, the other piston being spaced in said direction from said one piston and having its side toward said one piston subject to pressure generated thereby to be moved from a normal off position, means biasing said other piston to said normal off position, a source of hydraulic fluid pressure, normally closed fluid pressure transmitting conduit means between said source and the other set of wheel cylinders, said normally closed fluid pressure transmitting conduit means including valve means connected to and operable upon movement of said other piston from its normal off position for opening said normally closed fluid pressure transmitting conduit means to transmit fluid from said source to said other set of wheel cylinders, and means tending to retard movement of said other piston from its normal off position.

16. In a hydraulic braking system for an automotive vehicle having two pairs of wheel cylinders for the vehicle wheel brakes, a master cylinder comprising cylinder means having a pair of pistons therein, one of said pistons being manually movable in one direction to displace fluid from said cylinder means, fluid pressure transmitting conduit means for conveying such displaced fluid to one set of wheel cylinders, the other piston being spaced in said direction from said one piston and having its side toward said one piston subject to pressure generated thereby to be moved from a normal off position, means biasing said other piston to said normal off position, a source of hydraulic fluid pressure, normally closed fluid pressure transmitting conduit means between said source and the other set of wheel cylinders, said normally closed fluid pressure transmitting conduit means including valve means connected to and operable upon movement of said other piston from its normal off position for opening said normally closed fluid pressure transmitting conduit means to transmit fluid from said source to said other set of wheel cylinders, said cylinder means having a cylindrical chamber in which said other piston is movable away from a normal off position, and a restricted port communicating between said chamber and said normally closed fluid pressure transmitting conduit means between said source and said other set of wheel cylinders.

17. In a hydraulic braking system for an automotive vehicle having two pairs of wheel cylinders for the vehicle wheel brakes, a master cylinder comprising cylinder means having a pair of pistons therein, one of said pistons being manually movable in one direction to displace fluid from said cylinder means, fluid pressure transmitting conduit means for conveying such displaced fluid to one set of wheel cylinders, the other piston being spaced in said direction from said one piston and having its side toward said one piston subject to pressure generated by said one piston to be moved from a normal off position, means biasing said other piston to said normal off position, a source of hydraulic fluid pressure, normally closed fluid pressure transmitting conduit means between said source and the other set of wheel cylinders, said normally closed fluid pressure transmitting conduit means including valve means connected to and operable upon movement of said other piston from its normal off position for opening said normally closed fluid pressure transmitting conduit means to transmit fluid from said source to said other set of wheel cylinders, said cylinder means having a cylindrical chamber in which said other piston is movable away from a normal off position, a restricted port communicating between said chamber and said normally closed fluid pressure transmitting conduit means, and means operable after movement of said one piston from its normal off position for establishing mechanical connection between said pistons.

18. In a hydraulic braking system for an automotive vehicle having a pair of sets of wheel cylinders for operating the brakes, a master cylinder comprising cylinder means, a pair of pistons therein one of which is operable by the operator, means to transmit from said cylinder means hydraulic fluid displaced by said one piston to one set of wheel cylinders, a second piston slidable in said cylinder means, a source of hydraulic pressure, fluid pressure transmitting conduit means between said source and the other set of wheel cylinders, a valve controlling said fluid pressure transmitting conduit means to control the flow of fluid between said source and said other set of wheel cylinders, said valve normally occupying a closed position and being movable to an open position to connect said source to said other set of wheel cylinders, and means connected to mechanically transmit a force from said one piston to said second piston upon movement of said one piston to move said valve to open position.

19. A braking system according to claim 18, wherein said means connected to transmit a force from said one piston to said second piston comprises a compression spring.

References Cited in the file of this patent

UNITED STATES PATENTS

| | | |
|---|---|---|
| 2,317,846 | Campbell | Apr. 27, 1943 |
| 2,343,698 | Parnell | Mar. 7, 1944 |
| 2,410,269 | Chouings | Oct. 29, 1946 |
| 2,451,334 | Groves | Oct. 12, 1948 |
| 2,478,475 | Gardiner | Aug. 9, 1949 |

FOREIGN PATENTS

| | | |
|---|---|---|
| 622,617 | Great Britain | May 4, 1949 |